US010689126B2

(12) United States Patent
Scannell et al.

(10) Patent No.: US 10,689,126 B2
(45) Date of Patent: Jun. 23, 2020

(54) TWO-PIECE FIREWALL AND INLET PLENUM

(71) Applicant: Bell Helicopter Textron Inc., Fort Worth, TX (US)

(72) Inventors: Brent Scannell, Quebec (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 562 days.

(21) Appl. No.: 15/627,412

(22) Filed: Jun. 19, 2017

(65) Prior Publication Data

US 2018/0362177 A1    Dec. 20, 2018

(51) Int. Cl.
*B64D 33/02*    (2006.01)
*B64C 27/12*    (2006.01)
*B64C 1/10*    (2006.01)
*B64C 29/00*    (2006.01)
*B64D 45/00*    (2006.01)

(52) U.S. Cl.
CPC ............... *B64D 33/02* (2013.01); *B64C 1/10* (2013.01); *B64C 27/12* (2013.01); *B64C 29/0033* (2013.01); *B64D 2045/009* (2013.01)

(58) Field of Classification Search
CPC ........... B64D 33/02; B64C 1/10; B64C 27/12; B64C 27/04; B64C 29/0033
See application file for complete search history.

(56) References Cited

U.S. PATENT DOCUMENTS

| 3,744,743 | A | * | 7/1973 | Nay | B64C 27/12 |
| | | | | | 244/17.11 |
| 9,586,692 | B2 | * | 3/2017 | Bofill | B64D 33/02 |
| 2013/0087663 | A1 | * | 4/2013 | Dailey | B64D 33/02 |
| | | | | | 244/53 B |
| 2018/0043986 | A1 | * | 2/2018 | Miller | B64C 7/02 |
| 2019/0003430 | A1 | * | 1/2019 | Dionne | F01P 7/14 |
| 2019/0322383 | A1 | * | 10/2019 | Scannell | A62C 3/08 |

OTHER PUBLICATIONS

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014. (8 pages).

* cited by examiner

*Primary Examiner* — Justin M Benedik
(74) *Attorney, Agent, or Firm* — Patent Capital Group (57) ABSTRACT

In one embodiment, there is described an inlet plenum assembly for a rotary aircraft, including: an inlet plenum defined on a first side by an inlet plenum wall and on a second side by a forward firewall assembly; the inlet plenum wall having a mechanical interface for receiving a reduction gearbox (RGB) to provide reduction gearing to the drive shaft; and the forward firewall assembly having an inlet aperture configured to receive a drive shaft to rotatably couple to an engine; wherein the forward firewall assembly includes a forward firewall upper and a forward firewall lower, the forward firewall upper configured to removably seat to the forward firewall lower.

20 Claims, 8 Drawing Sheets

TWO-PIECE FIREWALL AND INLET PLENUM

TECHNICAL FIELD

This disclosure relates generally to rotary aircraft, and more particularly, though not exclusively, to a two-piece firewall and inlet plenum wall.

BACKGROUND

Rotary aircraft such as helicopters and tilt wing aircraft operate on internal combustion engines. Two common features of internal combustion engines are that they include air intakes, which provide oxygen for combustion, and that they operate at very high temperatures. Because of the high temperatures and risk of fire in an internal combustion engine vehicle, many such vehicles provide a firewall that provides a physical fire barrier between the engine compartment and other portions of the vehicle that may be affected by fire.

SUMMARY

In one embodiment, there is described an inlet plenum assembly for a rotary aircraft, including: an inlet plenum defined on a first side by a forward firewall assembly and on a second side by an inlet plenum wall; the forward firewall having an inlet aperture configured to receive a drive shaft to rotatably couple to an engine; and the inlet plenum wall assembly having a mechanical interface for receiving a reduction gearbox (RGB) to provide reduction gearing to the drive shaft; wherein the forward firewall assembly comprises a forward firewall upper and a forward firewall lower, the forward firewall upper configured to removably seat to the forward firewall lower.

DETAILED DESCRIPTION

In certain rotary aircraft, an inlet plenum assembly is defined, which may comprise a compartment defined on one side by an inlet plenum wall, and on the other side by a firewall. In some cases, the inlet plenum assembly includes a drive shaft assembly, and a reduction gearbox. The drive shaft may pass through an inlet aperture which provides air intake. In this configuration, removal of the engine for servicing can be difficult because the forward firewall and inlet plenum wall form a barrier.

However, in certain embodiments of the present disclosure, a novel inlet plenum assembly is described, in which the inlet plenum wall and firewall each comprise a two-piece assembly, which may include, for example, a lower that remains affixed to the aircraft, and which is removably attached to a removable upper. Thus, when the engine is to be serviced, the removable uppers may be detached from the fixed lowers, and the engine can then be removed with the driveshaft and RGB as a complete assembly.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
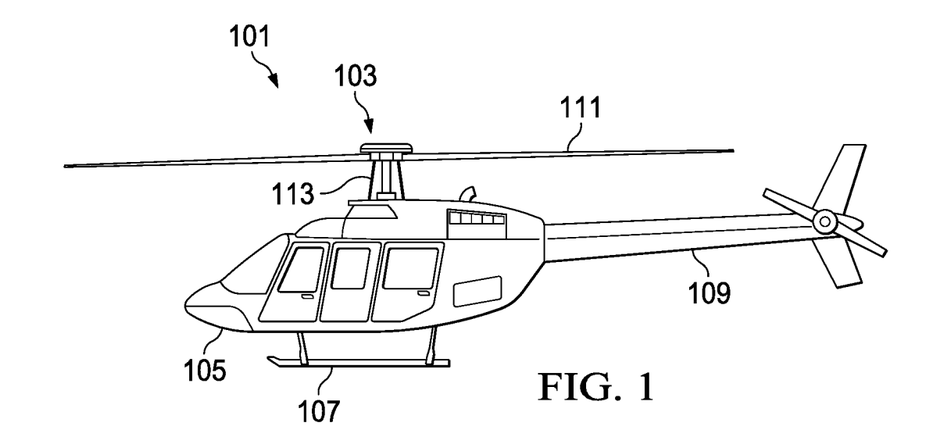
FIGS. 1 and 2 illustrate example aircraft in accordance with certain embodiments.

FIG. 1 illustrates an example embodiment of a rotorcraft 101. The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105, a tail rotor or anti-torque system, an empennage, and a tail structure 109. In the illustrated embodiment, tail structure 109 may be used as a horizontal stabilizer. Torque is supplied to rotor system 113 and the anti-torque system using at least one engine.

Figure 2:
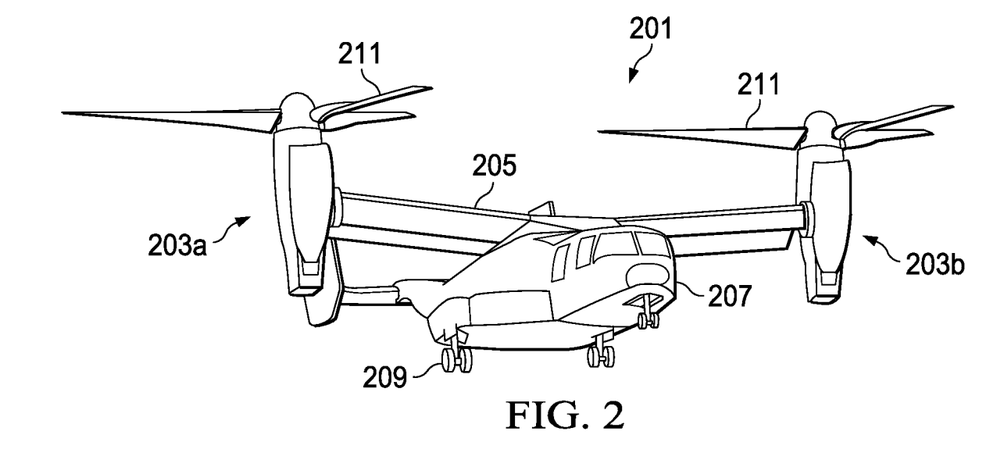

FIG. 2 illustrates a perspective view of an example tiltrotor aircraft 201. Tiltrotor aircraft 201 includes nacelles 203a and 203b, a wing 205, a fuselage 207, and a tail structure. Nacelles 203a and 203b respectively include rotor systems, and each rotor system includes a plurality of rotor blades 211. Moreover, each nacelle 203a and 203b may include an engine and gearbox for driving each rotor system, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, the tail structure may be used as a vertical stabilizer.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Figure 3:
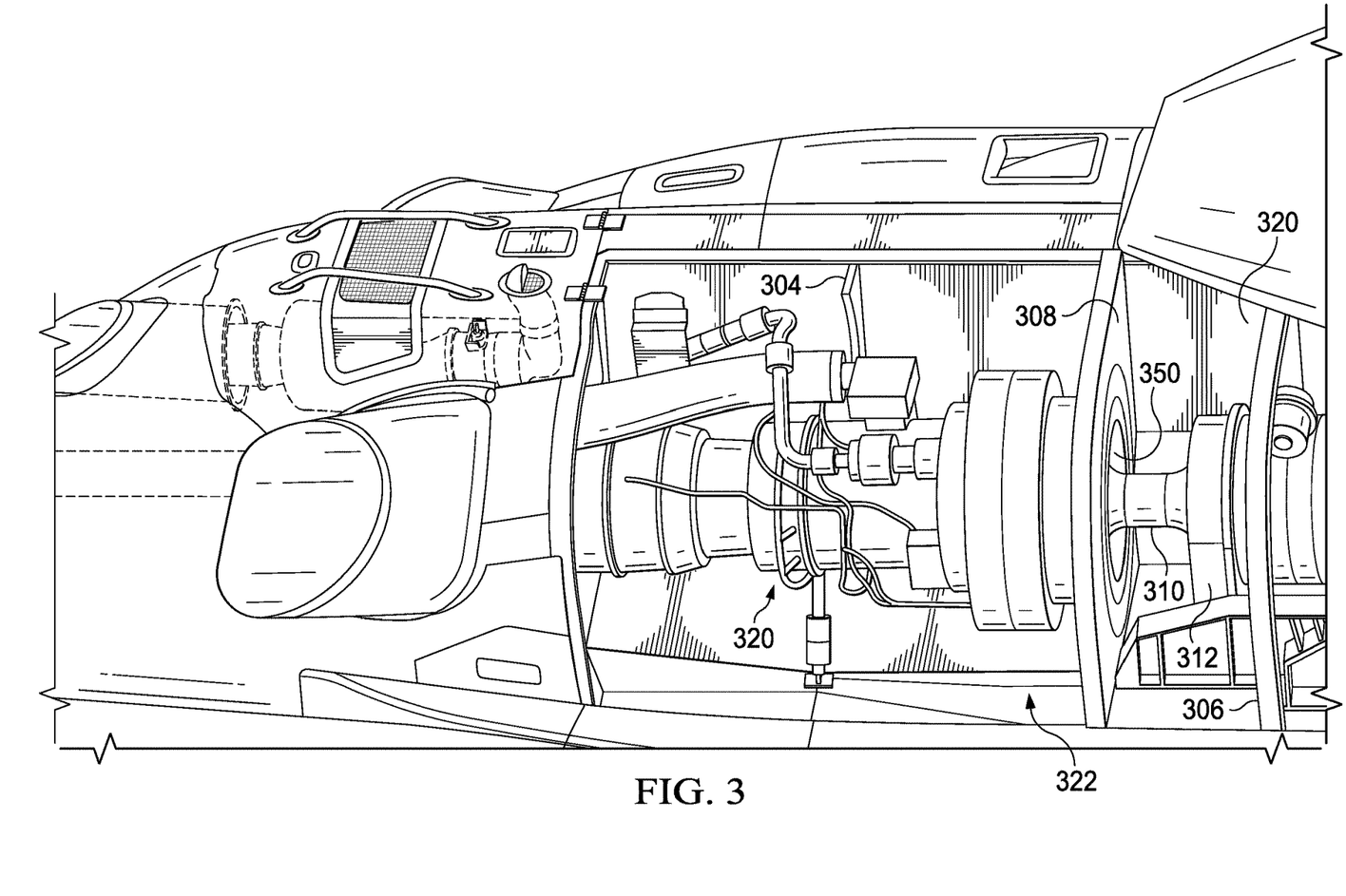
FIG. 3 is a cutaway side view illustration of selected elements of a rotary aircraft engine according to one or more examples of the present specification.

FIG. 3 is a cutaway side view illustration of selected elements of a rotary aircraft engine according to one or more examples of the present specification. In this example, a rotary aircraft engine 320 is encased within an engine compartment 322. As an internal combustion engine, rotary aircraft engine 320 runs at high temperatures and thus requires fire protection. Thus, two firewalls are provided, including a center firewall 304, and a forward firewall 308.

Rotary aircraft engine 320 also requires combustible air to operate. Thus, an inlet plenum is provided, including a forward firewall 308 with an inlet aperture 350. Inlet aperture 350 allows air to pass through to engine 320.

The inlet plenum is defined by a forward firewall 308 and inlet plenum wall 306. Driveshaft 310 passes through inlet aperture 350 and ultimately operates the rotors of the rotary aircraft. A reduction gearbox assembly (RGB) 312 provides reduction gearing to driveshaft assembly 310. In certain existing aircraft designs, because driveshaft 310 passes through inlet aperture 350, removal of the engine for servicing may require partial disassembly, such as disengaging driveshaft 310 and RGB 312 from engine 320.

However, as described herein, embodiments of the present disclosure provide a forward firewall 308 and inlet plenum wall 306 that include removable uppers. These removable uppers enable engine 320 to be more easily removed for servicing.

Figure 4A:
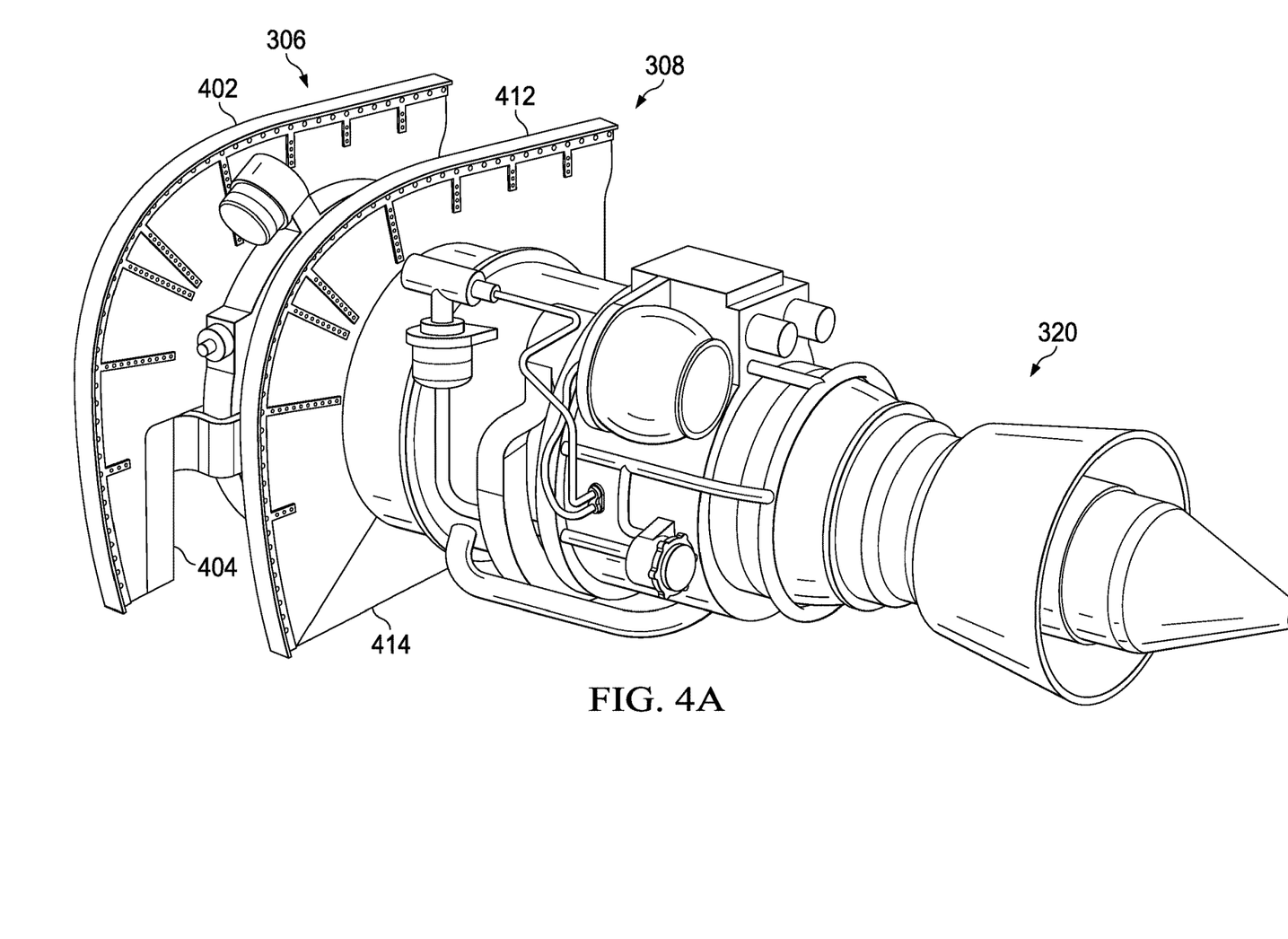
FIG. 4A is a perspective view of selected components according to one or more examples of the present specification.
Figure 4B:
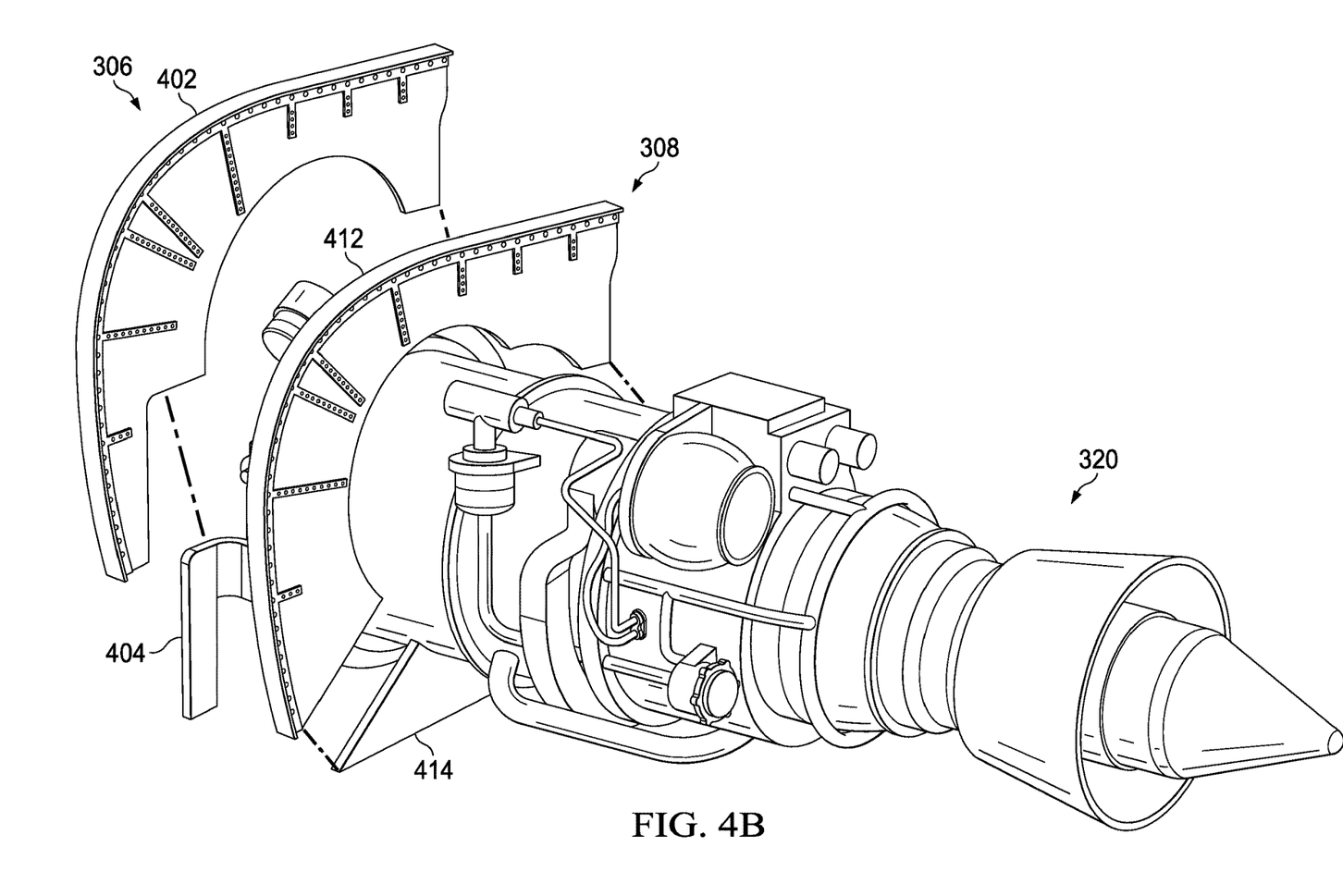
FIG. 4B is a further perspective view of selected components according to one or more examples of the present specification.

FIGS. 4A and 4B are perspective views of selected components illustrating certain features of the present specification.

Visible in FIG. 4A is engine 320, including an inlet plenum wall 306 and forward firewall 308, defining an inlet plenum assembly. In this example, forward firewall 308 includes a forward firewall upper 412, and a forward firewall lower 414. Forward firewall upper 412 may be removable from forward firewall lower 414, thus enabling easier disengagement of engine 320. In certain embodiments, forward firewall lower 414 may be affixed to the aircraft structure or chassis, such as by welding, rivets, bolting, or other secure and relatively permanent affixing means. Forward firewall upper 412 may be removably attached to forward firewall lower 414. Thus, when it is necessary to service engine 320, forward firewall upper 412 can be detached from forward firewall lower 414, facilitating easier removal of engine 320.

Similarly, inlet plenum wall 306 may include an inlet plenum wall upper 402 and an inlet plenum wall lower 404. As with forward firewall lower 414, inlet plenum wall lower 404 may be relatively permanently attached to the aircraft chassis, such as via welding, rivets, bolts, or other means. Inlet plenum wall upper 402 may be removably attached to inlet plenum wall lower 404, so that when it is necessary to service RGB 312, inlet plenum wall upper 402 can be detached, thus facilitating easier removal of RGB 312.

FIG. 4B illustrates an example wherein inlet plenum wall upper 402 and forward firewall upper 412 are removed from their respective lowers, inlet plenum wall lower 404 and forward firewall lower 414 for servicing of engine 320. It should be noted that removing both upper components provides for easier access, replacement, and/or servicing of the assembled and intact engine 320, RGB 312, and driveshaft 310. As can be seen in this illustration, with the two uppers 402 and 412 removed, engine 320 can be relatively easily lifted out without obstruction.

Figure 5A:
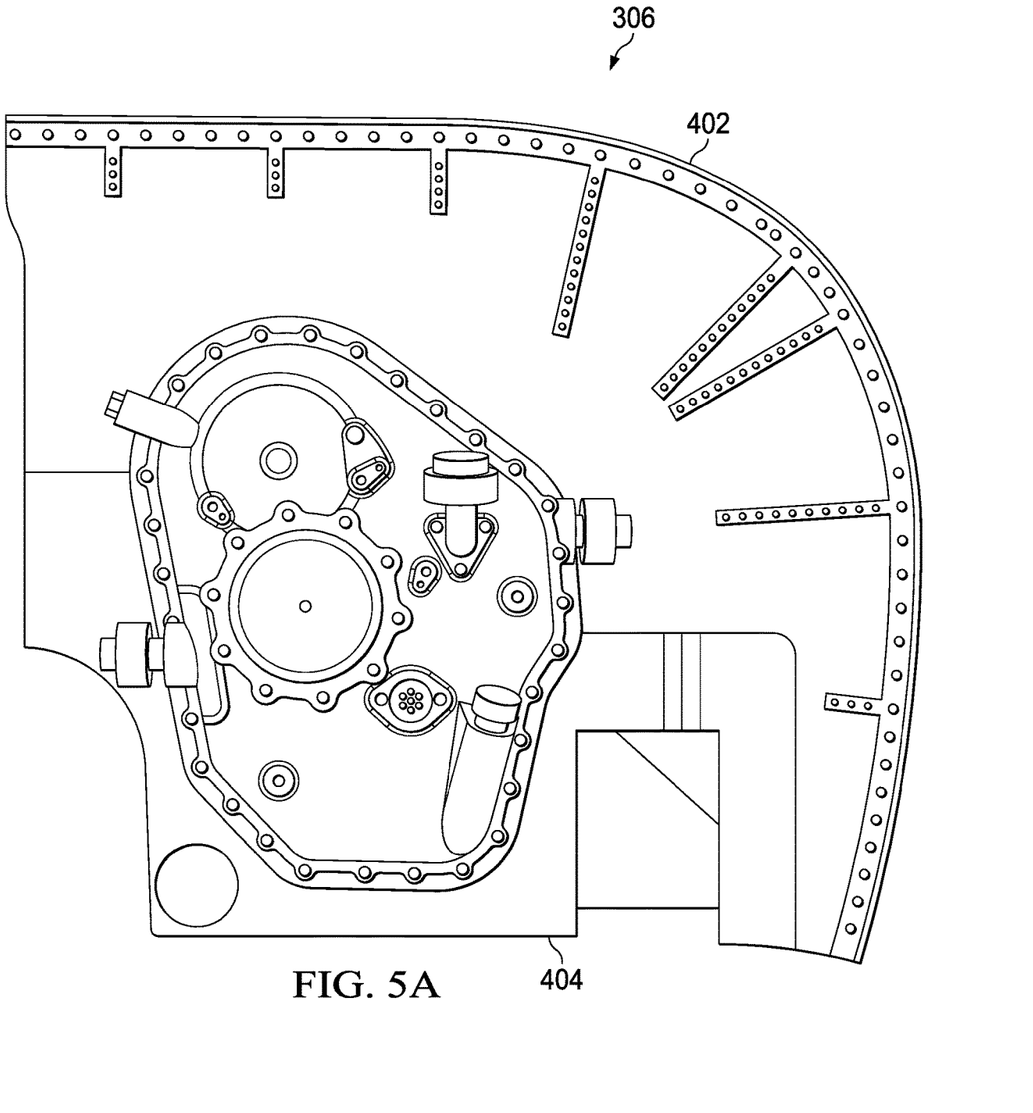
FIG. 5A is a front view of an inlet plenum wall according to one or more examples of the present specification.
Figure 5B:
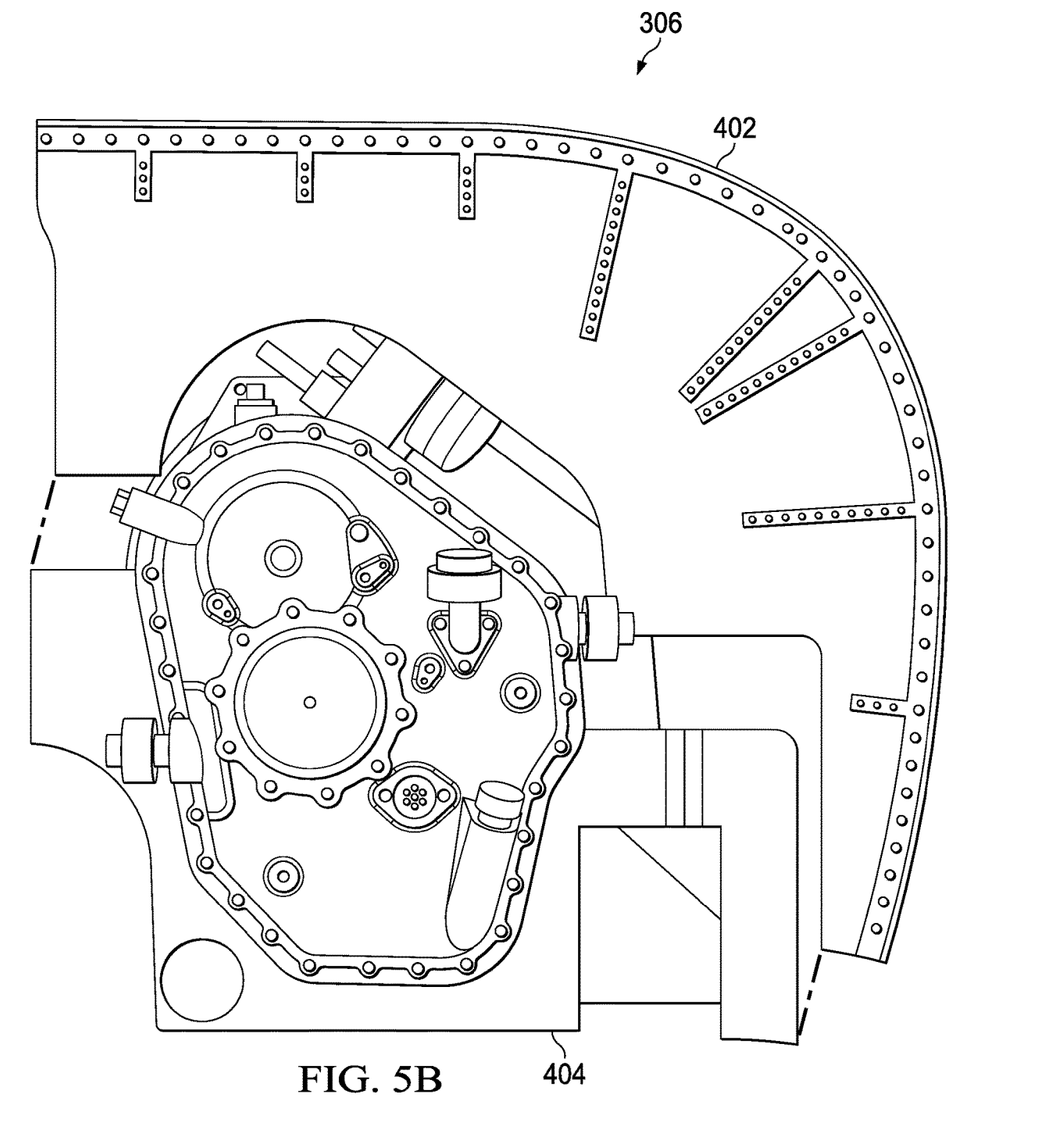
FIG. 5B is a further front view of an inlet plenum wall according to one or more examples of the present specification.

FIGS. 5A and 5B are a front view of inlet plenum wall 306 illustrating the same principles as disclosed in FIGS. 4A and 4B. As seen in this view, inlet plenum wall 306 includes an inlet plenum wall lower 404 and an inlet plenum wall upper 402. As illustrated in FIG. 5B, inlet plenum wall upper 402 may be detached from inlet plenum wall lower 404.

Figure 6:
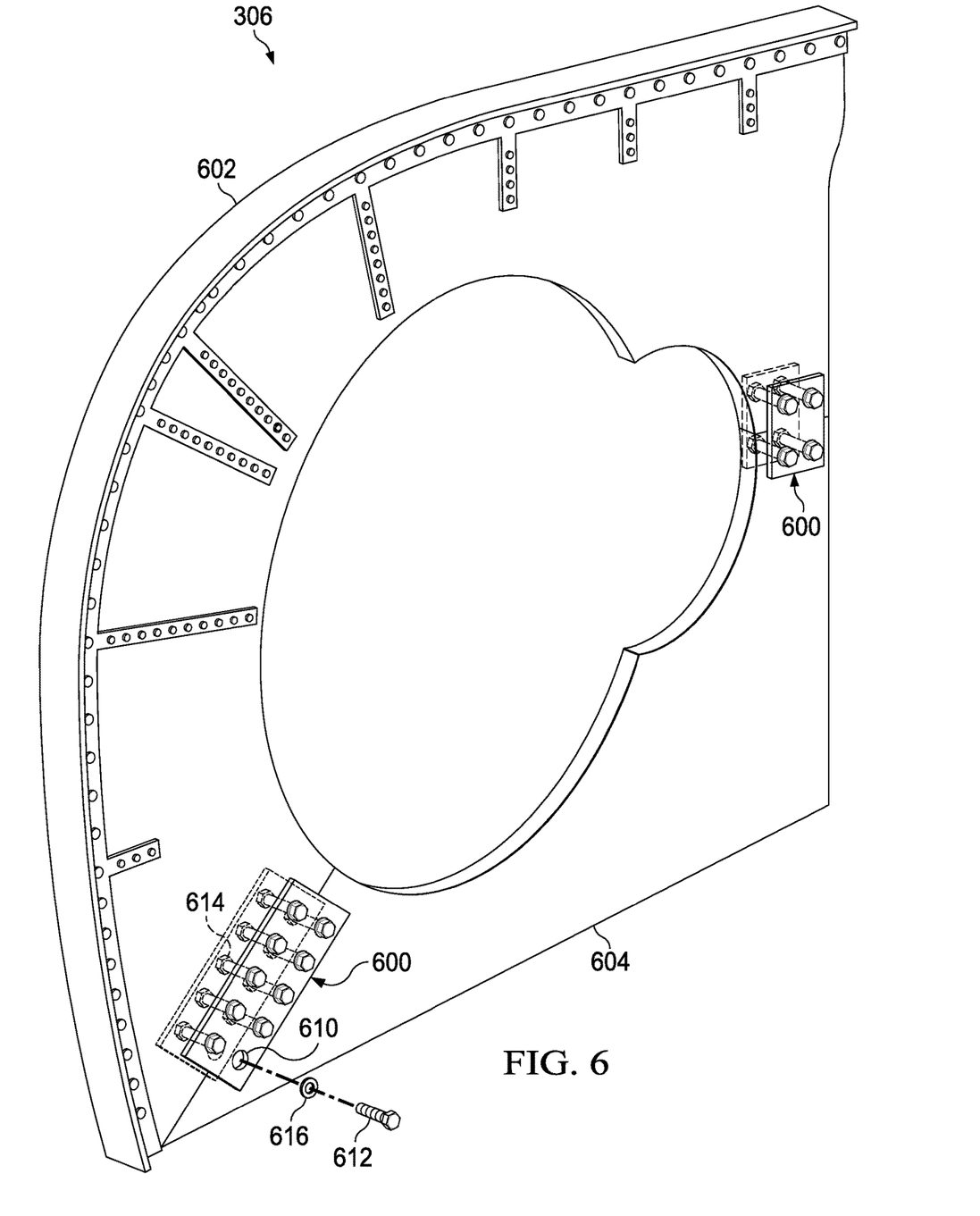
FIGS. 6 and 7 illustrate embodiments of mechanically coupling an upper to a lower according to one or more examples of the present specification.
Figure 7:
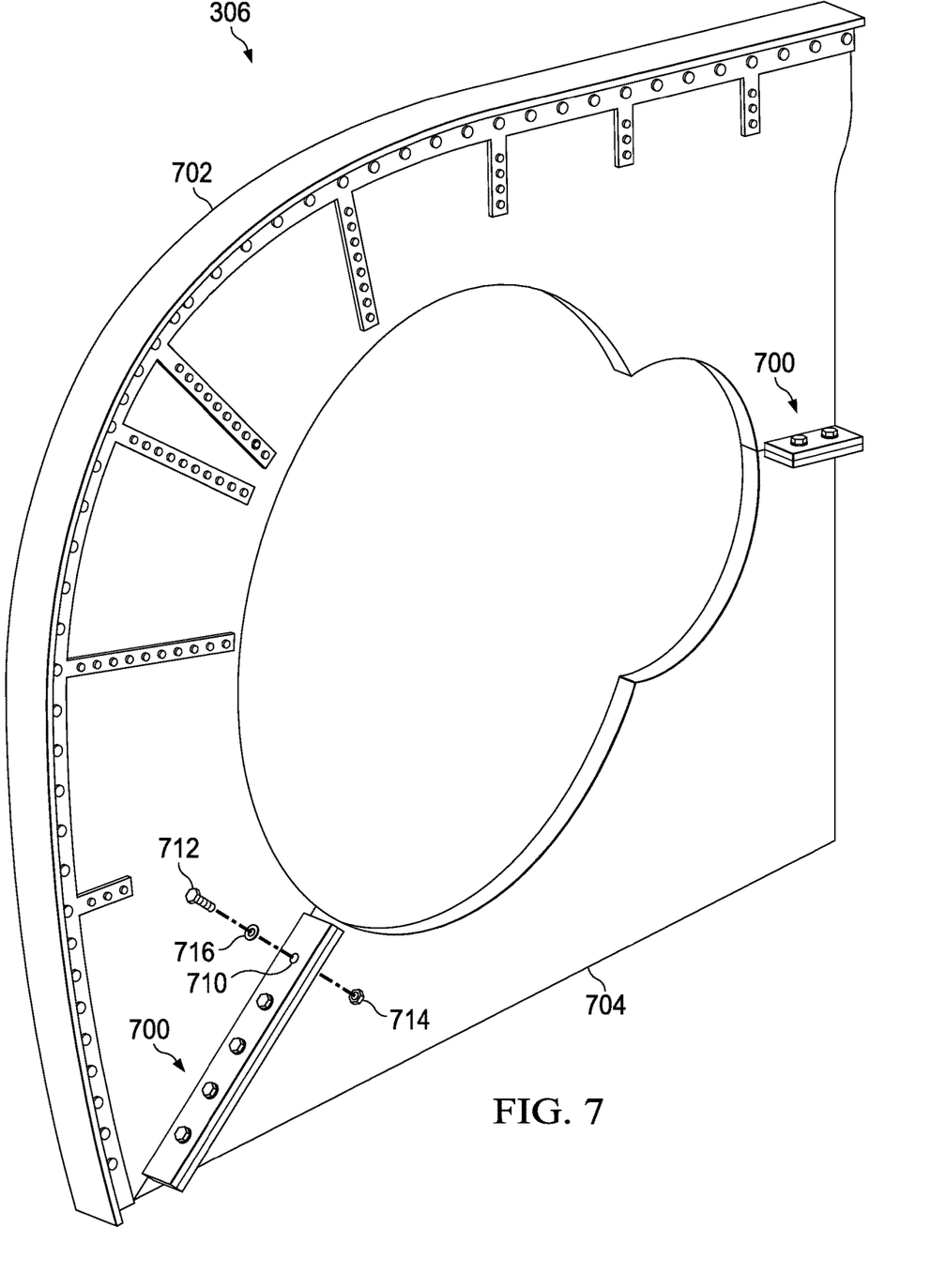

FIGS. 6 and 7 illustrate embodiments of mechanically coupling an upper to a lower according to one or more examples of the present specification.

FIG. 6 is a detail perspective view of selected components of the present specification. In certain embodiments, a mounting plate 600 may be provided at the mechanical interface between an upper 602 and a lower 604. Upper 602 may refer to either inlet plenum wall upper 402, or forward firewall upper 412. Lower 604 may refer to either inlet plenum wall lower 404, or forward firewall lower 414. Mounting plate 600 may be affixed parallel to its respective wall, and in certain embodiments, a mirrored mounting plate 600 may be affixed opposite to the first mounting plate 600. Mounting plate 600 may provide through holes 610, through which bolts 612 may be inserted, secured by nuts 614 and washers 616. Note that bolts 612 are disclosed by way of nonlimiting example only, and other appropriate fastening means may be used FIG. 7 is a detail perspective view of selected components of the present specification. In certain embodiments, a mounting flange 700 may be provided at the mechanical interface between an upper 702 and a lower 704. Upper 702 may refer to either inlet plenum wall upper 402, or forward firewall upper 412. Lower 704 may refer to either inlet plenum wall lower 404, or forward firewall lower 414. Mounting flange 700 may include a protrusion orthogonal to the plane of the respective wall. Mounting flange 700 may provide through holes 710, through which bolts 712 may be inserted, secured by nuts 714 and washers 716. Note that bolts 712 are disclosed by way of nonlimiting example only, and other appropriate fastening means may be used.

In one or more embodiments, upper 702 and lower 704 may be configured so that mounting flanges 700 form an "L" shape relative to their respective walls. The legs of the two "L" shapes abut one another, and fasteners secure the two L's together. In one embodiment, the legs of the L's are disposed to be away from and outside of the actual inlet plenum assembly. This provides safety from "foreign object damage" (FOD) to the engine. Because the L's are oriented away from the inlet plenum assembly, if a fastener becomes dislodged, it does not fall into the inlet plenum compartment (which could expose the engine air inlet to risk of ingesting the aforementioned hardware). Rather, it may simply fall to the frame where it can safely be retrieved later.

The embodiments described throughout this disclosure provide numerous technical advantages, including by way of example, the ability to detach a portion of the forward firewall and inlet plenum wall during servicing of a rotary aircraft. This enables removal of the engine without the need to disengage the driveshaft assembly and RGB assembly.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An inlet plenum assembly for a rotary aircraft, comprising:
    an inlet plenum defined on a first side by an inlet plenum wall and on a second side by a forward firewall assembly;
    the inlet plenum wall having a mechanical interface for receiving a reduction gearbox (RGB) to provide reduction gearing to the drive shaft; and
    the forward firewall assembly having an inlet aperture configured to receive a drive shaft to rotatably couple to an engine;
    wherein the forward firewall assembly comprises a forward firewall upper and a forward firewall lower, the forward firewall upper configured to removably seat to the forward firewall lower.

2. The inlet plenum assembly of claim 1, wherein the forward firewall lower is configured to be mechanically fixed to the rotary aircraft.

3. The inlet plenum assembly of claim 1, wherein the inlet plenum wall comprises an inlet plenum wall upper and an inlet plenum wall lower, the inlet plenum wall upper configured to removably seat to the inlet plenum wall lower.

4. The inlet plenum assembly of claim 3, wherein the inlet plenum wall lower is configured to be mechanically fixed to the rotary aircraft.

5. The inlet plenum assembly of claim 3, further comprising mounting hardware to removably secure the inlet plenum wall upper to the inlet plenum wall lower.

6. The inlet plenum assembly of claim 1, wherein the mechanical interface for receiving the RGB comprises an RGB seal to provide a seal between the inlet plenum wall and the RGB.

7. The inlet plenum assembly of claim 1, further comprising mounting hardware to removably secure the forward firewall upper to the forward firewall lower.

8. The inlet plenum assembly of claim 1, wherein the inlet plenum wall and forward firewall assembly form an abutting "L" shape, wherein a short leg of the "L" is oriented away from an engine air inlet plenum.

9. A rotary aircraft, comprising:
    an engine;
    a driveshaft rotatably coupled to the engine;
    a reduction gearbox (RGB) mechanically coupled to the driveshaft and configured to provide reduction gearing to the driveshaft; and
    an inlet plenum assembly, comprising:
        an inlet plenum defined on a first side by an inlet plenum wall and on a second side by a forward firewall assembly;
        the inlet plenum wall having a mechanical interface for receiving a reduction gearbox (RGB) to provide reduction gearing to the drive shaft; and
        the forward firewall assembly having an inlet aperture configured to receive a drive shaft to rotatably couple to an engine;
        wherein the forward firewall assembly comprises a forward firewall upper and a forward firewall lower, the forward firewall upper configured to removably seat to the forward firewall lower.

10. The rotary aircraft of claim 9, wherein the forward firewall lower is configured to be mechanically fixed to the rotary aircraft.

11. The rotary aircraft of claim 9, wherein the inlet plenum wall comprises an inlet plenum wall upper and an inlet plenum wall lower, the inlet plenum wall upper configured to removably seat to the inlet plenum wall lower.

12. The rotary aircraft of claim 11, wherein the inlet plenum wall lower is configured to be mechanically fixed to the rotary aircraft.

13. The rotary aircraft of claim 11, further comprising mounting hardware to removably secure the inlet plenum wall upper to the inlet plenum wall lower.

14. The rotary aircraft of claim 9, wherein the mechanical interface for receiving the RGB comprises an RGB seal to provide a seal between the inlet plenum wall and the RGB.

15. The rotary aircraft of claim 9, further comprising mounting hardware to removably secure the forward firewall upper to the forward firewall lower.

16. The inlet plenum assembly of claim 9, wherein the inlet plenum wall and forward firewall assembly form an abutting "L" shape, wherein a short leg of the "L" is oriented away from an engine air inlet plenum.

17. A boundary wall for an inlet plenum assembly of a rotary aircraft, comprising:
- a lower member configured to mount to a chassis of the rotary aircraft, and comprising a lower half of a mechanical interface for receiving an operational component of the rotary craft;
- an upper member configured to removably seat to the lower member, and comprising an upper half of the mechanical interface; and
- a mounting interface for receiving mounting hardware to secure the upper member to the lower member.

18. The boundary wall of claim 17, wherein the boundary wall is a forward firewall.

19. The boundary wall of claim 18, wherein the operational component is a reduction gearbox.

20. The boundary wall of claim 19, wherein the mounting interface comprises a flange with through holes.

* * * * *